April 21, 1959  J. F. SCOTT  2,882,778
MUSICAL TOY PIANO WITH MUSIC BOX
Filed Dec. 13, 1956  2 Sheets-Sheet 1

INVENTOR.
Joseph F. Scott
BY Michael S. Striker
agt.

April 21, 1959 J. F. SCOTT 2,882,778
MUSICAL TOY PIANO WITH MUSIC BOX
Filed Dec. 13, 1956 2 Sheets-Sheet 2
FIG. 2
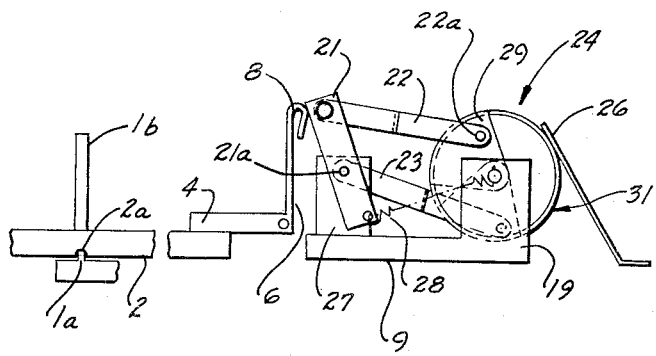
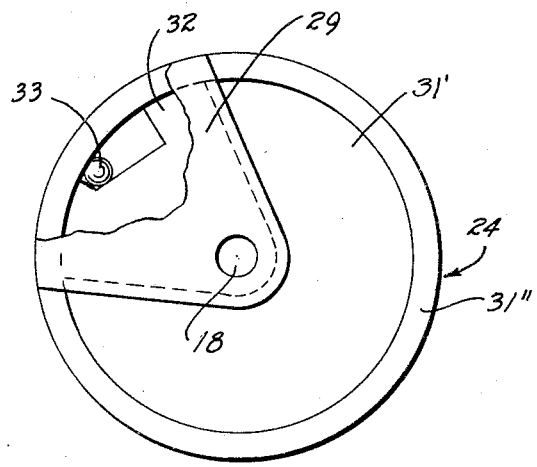
FIG. 3
INVENTOR.
Joseph F. Scott
BY Michael S. Striker
agf.

ary Office 2,882,778
Patented Apr. 21, 1959

2,882,778

MUSICAL TOY PIANO WITH MUSIC BOX

Joseph F. Scott, New York, N.Y.

Application December 13, 1956, Serial No. 628,113

8 Claims. (Cl. 84—95)

The present invention relates to a musical toy and more particularly to a piano-shaped toy having depressable keys which are interconnected with a musical movement in the housing of the toy to operate said movement.

Musical toys according to the prior art include many complex parts which are too soon destroyed by children, and give good service only if the most expensive materials and workmanship go into the manufacture thereof.

The present invention provides a musical toy which is of simplified construction and durable and which is particularly adapted for educational use in kindergartens or in television programs to instruct youngsters regarding the nature of a piano and the production of music therefrom.

It is an object of the present invention to provide a musical toy which improves over the articles in the prior art in that it has smoothly cooperating parts which are easily assembled and which stand up well in use.

It is a further object of the present invention to provide a musical toy which plays a melody even when used by a musically untrained child.

It is yet another object of the present invention to provide a musical toy which helps train a very young child and encourages his interest in music.

Still another object of the invention is to provide a piano-shaped musical toy constructed and arranged to play music only when the child operates it in proper piano-playing position.

A further object of the invention is to provide a piano-shaped musical toy combining the features of a music box and a toy piano having keys operable by a very young child.

Another very important object of the invention is to provide a musical toy which plays music in response to the child's depression of one, several, or all of the keys.

With the above objects in view, the present invention mainly consists in a musical toy comprising a housing, a plurality of depressable keys mounted on the housing, a musical movement mounted in the housing, and movement actuating means mounted in the housing and operable in response to depression of any of the keys so that the musical movement is activated regardless of the sequence in which the keys are depressed.

More specifically, the movement actuating means includes a bar member pivotally mounted and extending over a portion of each of the keys in such a manner that it will tilt in response to depression of at least one of the keys and thereby cause actuation of the movement.

While the embodiment illustrated and described herein shows a piano-shaped housing, it is clear that the structure described in connection therewith can very easily be installed and arranged in toys having the shape of other musical instruments, such as, for example, organs, accordions, and other key-operated instruments.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings, in which:

Fig. 2 is a fragmentary side view of the actuation means of Fig. 1; and

Fig. 3 is a further fragmentary side view of detail of the actuation means according to the invention.

Figure 1:
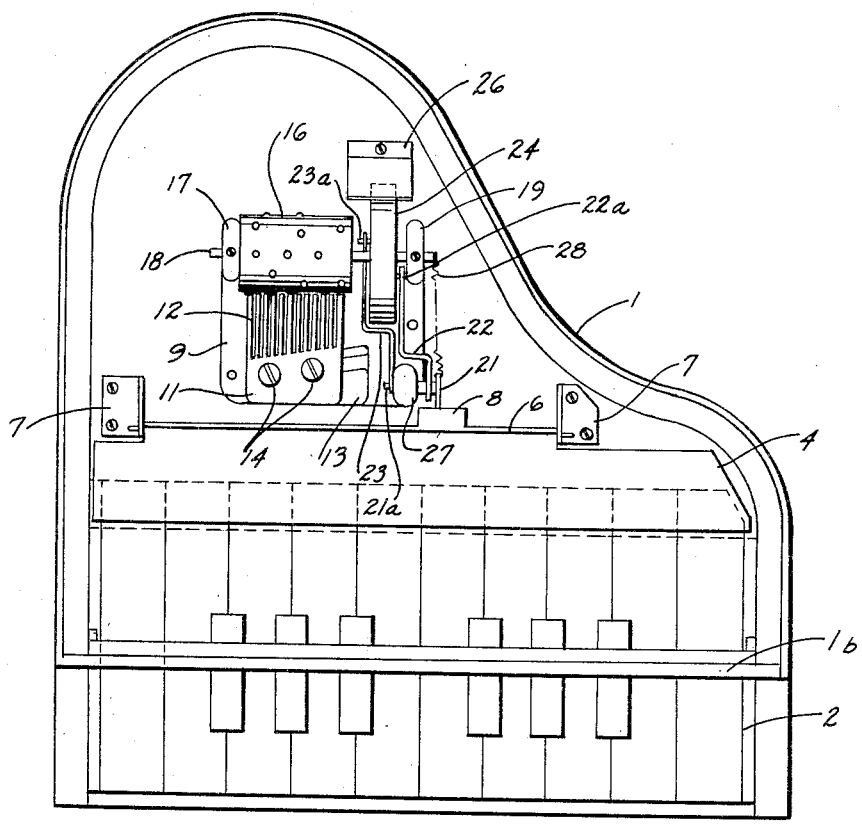
Fig. 1 is a plan view of a piano-shaped toy according to the present invention, with the top cover not shown.

Referring now to the drawings, in Fig. 1 there is shown a piano-shaped housing 1, having keys 2 mounted thereon and bar member 4 mounted in the housing and projecting over the end portion of each key to move between a normal position and an actuated position. The keys 2 are pivotally mounted by means of grooves 2a on a ridge 1a in the housing which permits them to be moved between a released and a depressed position by depression of the part of the key which is outside the housing and forwardly of the front plate 1b.

The bar member 4 has a transverse backplate 6 which is pivotally mounted in mounting members 7 which are attached to the housing. The backplate 6 has a rearwardly projecting portion 8 which is displaced when the bar is tilted and moves the first lever 21 to actuate the musical movement located in the housing.

The musical movement includes a rotatable drum 16 having a series of lateral peripheral rows of projections which are contacted by the flexible tines or finger portions 12 of tonal member 11 which is attached to the housing by means 13 and screws 14, which are secured to the mounting plate 9. The drum 16 is turnably mounted on shaft 18 which is supported on mounting means 17 and 19 which are connected to mounting plate 9 which is mounted on the housing.

A friction clutch or friction clutch means 24 is also mounted on shaft 18 for rotation with drum 16 which is actuated by movement of lever 21 which has lever 22 pivotally connected with it at one end and spring 28 at the other end. The lever 21 is pivotally connected at its midpoint by a pin 21a with mounting means 27, which is fixed to mounting plate 9. Pin 21a passes through means 27 and is secured to lever 23.

The levers 22 and 23 are each doubly bent to have an intermediate portion between bends which is of a length approximately equal to the width of wheel rim 31". The shaft 18 projecting beyond means 19 is grooved for receiving thereon the other end of spring 28.

The friction clutch 24 having a turnable clutch member 31 comprising a centrally located web 31' fixedly attached to shaft 18 and a rim portion 31", includes on either side thereof outer sector shaped plates 29, 29' respectively and inner similarly shaped plates 32. Plate 32, located at the right side of clutch 24, as viewed in Fig. 1, is eccentrically slotted to receive friction ball 33, as shown in Fig. 3. The plates 32 are disposed within the rim 31", while the outer plates 29 and 29' oppose this rim.

The lever member 22 is pivotally connected to the outer plate 29, and the inner plate 32 adjacent thereto as shown in Fig. 2 and the lever member 23 is similarly connected to the other outer plate 29' and inner plate 32 on the other side of the turnable clutch member 31. The members 29, 32 located on one side of the turnable clutch member 31 constitute a pivoted clutch member cooperating with turnable clutch member 31 for actuation of the musical movement and the similar members located on the other side of turnable clutch member 31 provide brake means preventing backslide of the drum while the pivoted clutch member is being returned to its normal position upon cessation of depression of any of the keys 2, by the pull of spring 28.

A spring 26 frictionally engages the rim 31" of turnable clutch member 31. The levers 21, 22 constitute lever means for connecting the spring 28 with the pivoted clutch member 29, 32.

It can be seen that the bar member 4 will actuate the musical movement whether one, several, or all keys 2 are depressed at one time.

In operation, the depression of a key 2 causes movement of pivotally mounted bar member 4 from its normal position to an actuating position for pivoting lever 21 causing forward movement of lever 22, shifting of the pivotably movable clutch member 29 and locking engagement of ball 33 which turns wheel 31 to cause forward turning or step-wise advance of friction clutch 24 and of the drum 16 fastened thereto, so that the tines 12 are hit by the particular row of projections and play a part of a melody. Ball 33 constitutes therefore coupling means for coupling the pivoted clutch member 29, 32 to the turnable clutch member 31.

When the bar member 4 under the action of spring 28 moves back to its normal position upon release of the key 2, the member 32 located between plate 29' and web 31' and spring 26 cause braking engagement of wheel 31 to hold the drum 16 in its advanced position until the lever 21 has moved to tilt the member 29 and member 32 connected thereto, whereby the ball 33 is shifted to release member 31. The spring 28 is connected as shown in Fig. 2 to cause return of lever 21 from its actuation position. From the above description of the operation it will be understood that the elements 4, 8, 21, 22, 23, 32, 33 and 24 constitute musical movement actuating means which are controlled by the keys 2.

The slotted plates 32 are reversibly interchangeable, the slot in one position being mounted to form part of the drive means and in its reverse position, to form part of the braking means.

Thus, each time the bar member 4 moves to its actuated position, the musical movement is operated due to advancement of the drum and corresponding sequential engagement of the rows of projections by the flexible portions 12, and, upon return of the bar member 4 to its normal position, the friction clutch member 24 is released. The following actuations of any key 2 again actuate the musical movement to play the next parts of a tune so that the movement is actuated in a step-by-step motion and repeated operation of the keys results in continued operation of the musical movement.

It will be understood that each of the elements described above, or two or more together, may also find a useful application in other types of musical toys differing from the types described above.

While the invention has been illustrated and described as embodied in a piano-shaped toy provided with a step-wise actuated musical movement, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be secured by Letters Patent is:

1. A musical toy comprising in combination, a piano-shaped housing; a plurality of depressable keys pivotally mounted on said housing for movement between a depressed position and a released position; a musical movement mounted in said housing and including a turnable drum member; a bar member pivotally mounted in said housing extending over a portion of each of said keys, said bar member being movable in response to depression of at least one of said keys between an actuated position and a normal position; spring means urging said bar member into said normal position; and actuating means connecting said bar member with said musical movement for operating said musical movement each time said bar member moves to said actuated position, said actuating means including friction clutch means comprising a turnable clutch member connected to said turnable drum member of said musical movement, a pivoted clutch member operating connected to said bar member for pivotal movement therewith, and coupling means for coupling said pivoted clutch member to said turnable clutch member during each movement of said bar member from said normal position to said actuated position, and for releasing said turnable clutch member during the return movement of said bar member, whereby said turnable member of said musical movement is actuated in a step-by-step motion so that repeated operation of said keys results in continued operation of the musical movement.

2. A musical toy comprising in combination, a piano-shaped housing; a plurality of depressable keys pivotally mounted in a plane in said housing for movement between a depressed position and a released position; a musical movement mounted in said housing including a turnable member; a bar member pivotally mounted in said housing, said bar member including a base plate extending over a portion of each of said keys and another plate extending transverse to said base plate, said bar member being movable in response to depression of at least one of said keys between actuated position and a normal position; spring means connected to said other plate of said bar member for urging said bar member into said normal position; and actuating means connecting said bar member with said musical movement for operating said musical movement each time said bar member moves to said actuated position.

3. A musical toy comprising in combination, a piano-shaped housing; a plurality of depressable keys pivotally mounted in a plane in said housing for movement between a depressed position and a released position; a musical movement mounted in said housing including a turnable member; a bar member pivotally mounted in said housing, said bar member including a base plate extending over a portion of each of said keys and another plate extending transverse to said base plate, said bar member being movable in response to depression of at least one of said keys between an actuated position and a normal position; spring means connected to said other plate of said bar member for urging said bar member into said normal position; and actuating means connecting said bar member with said musical movement for operating said musical movement each time said bar member moves to said actuated position said actuating means including friction clutch means comprising a turnable clutch member connected to said turnable member of said musical movement, a pivoted clutch member operatively connected to said bar member for pivotal movement therewith, and coupling means for coupling said pivoted clutch member to said turnable clutch member during each movement of said bar member from said normal position to said actuated position, and for releasing said turnable clutch member during the return movement of said bar member whereby said turnable member of said musical movement is actuated in a step-by-step motion so that repeated operation of said keys results in continued operation of the musical movement.

4. A musical toy comprising in combination, a piano-shaped housing; a plurality of depressable keys pivotally mounted on said housing for movement between a depressed position and a released position; a musical movement mounted in said housing included a turnable drum having a plurality of lateral rows of projections thereon, and a tonal element adjacent said drum and having flexible portions adapted to engage said projections; a bar member pivotally mounted in said housing extending over a portion of each of said keys, said bar member being movable in response to depression of at least one of said keys between an actuated position and a normal position; spring means urging said bar member into said normal position; and actuating means connecting said bar member with said musical movement for operating said musical movement each time said bar member moves to said actuated position, said actuating means including friction clutch means comprising a turnable clutch member connected to said turnable drum of said musical movement and adapted to advance said drum to cause corresponding sequential engagement of said rows of projections by said flexible portions, a pivoted clutch member operatively connected to said bar member for pivotal movement therewith, and coupling means for coupling said pivoted clutch member to said turnable clutch member during each movement of said bar member from said normal position to said actuated position, and for releasing said turnable clutch member during the return movement of said bar member whereby said turnable member of said musical movement is actuated in a step-by-step motion so that repeated operation of said keys results in continued operation of the musical movement.

5. A musical toy comprising in combination, a piano-shaped housing; a plurality of depressible keys pivotally mounted in a plane in said housing for movement between a depressed position and a released position; a musical movement mounted in said housing including a turnable drum having a plurality of lateral rows of projections thereon, and a tonal element adjacent said drum and having flexible portions adapted to engage said projections; a bar member pivotally mounted in said housing, said bar member having a base plate extending over a portion of each of said keys and another plate extending transverse to said base plate, said bar member being movable in response to depression of at least one of said keys between an actuated position and a normal position; spring means engaging said other plate of said bar member for urging said bar member into said normal position; and actuating means connecting said bar member with said musical movement for operating said musical movement each time said bar member moves to said actuated position, said actuation means including friction clutch means comprising a turnable clutch member connected to said turnable drum of said musical movement and adapted to advance said drum to cause corresponding sequential engagement of said rows of projections by said flexible portions, a pivoted clutch member operatively connected to said bar member for pivotal movement therewith, and coupling means for coupling said pivoted clutch member to said turnable clutch member during each movement of said bar member from said normal position to said actuated position, and for releasing said turnable clutch member during the return movement of said bar member whereby said turnable member of said musical movement is actuated in a step-by-step motion so that repeated operation of said keys results in continued operation of the musical movement.

6. A musical toy comprising in combination, a piano-shaped housing; a plurality of depressible keys pivotally mounted on said housing for movement between a depressed position and a released position; a musical movement mounted in said housing and including a turnable drum member; a bar member pivotally mounted in said housing extending over a portion of each of said keys, said bar member being movable in response to depression of at least one of said keys between an actuated position and a normal position; spring means urging said bar member into said normal position; and actuating means connecting said bar member with said musical movement for operating said musical movement each time said bar member moves to said actuated position, said actuating means including friction clutch means comprising a turnable clutch member connected to said turnable drum member of said musical movement, a pivoted clutch member operatively connected to said bar member for pivotal movement therewith, coupling means for coupling said pivoted clutch member to said turnable clutch member during each movement of said bar member from said normal position to said actuated position, and for releasing said turnable clutch member during the return movement of said bar member, and lever means connecting said spring means and said pivoted clutch member and adapted to be engaged with said bar member for operation of said spring means and said clutch member whereby said turnable member of said musical movement is actuated in a step-by-step motion so that repeated operation of said keys results in continued operation of the musical movement.

7. A musical toy comprising in combination, a piano-shaped housing; a plurality of depressable keys pivotally mounted on said housing for movement between a depressed position and a released position; a musical movement mounted in said housing and including a turnable drum member; a bar member pivotally mounted in said housing extending over a portion of each of said keys, said bar member being movable in response to depression of at least one of said keys between an actuated position and a normal position; spring means urging said bar member into said normal position; and actuating means connecting said bar member with said musical movement for operating said musical movement each time said bar member moves to said actuated position, said actuating means including friction clutch means comprising a turnable clutch member connected to said turnable drum member of said musical movement, a pivoted clutch member operatively connected to said bar member for pivotal movement therewith, coupling means for coupling said pivoted clutch member to said turnable clutch member during each movement of said bar member from said normal position to said actuated position, and for releasing said turnable clutch member during the return movement of said bar member, and a lever means connecting said spring means and said pivoted clutch member and adapted to be engaged with said bar member for operation of said spring means and said pivoted clutch member, said turnable clutch member being advanced in the same direction as said bar member is pivotally moved in response to depression of at least one of said keys and being returned in the same direction as said bar member is moved in returning to its normal position whereby said turnable member of said musical movement is actuated in a step-by-step motion so that repeated operation of said keys results in continued operation of the musical movement.

8. A musical toy comprising in combination, a piano-shaped housing; a plurality of depressable keys pivotally mounted in a plane in said housing for movement between a depressed position and a released position; a musical movement mounted in said housing including a turnable member; a bar member pivotally mounted in said housing, said bar member including a base plate extending over a portion of each of said keys and another plate extending transverse to said base plate, said bar member being movable in response to depression of at least one of said keys between an actuated position and a normal position; spring means connected to said other plate of said bar member for urging said bar member into said normal position; and actuating means connecting said bar member with said musical movement for operating said musical movement each time said bar member moves to said actuated position said actuating means including friction clutch means comprising a turnable clutch member connected to said turnable member of said musical movement, a pivoted clutch member operatively connected to said bar member for pivotal movement therewith and coupling means for coupling said pivoted clutch member to said turnable clutch member during each movement of said bar member from said normal position to said actuated position, and for releasing said turnable clutch member during the return movement of said bar member, said turnable clutch member including brake means operable upon release of said turnable clutch member, and lever means connecting said spring means and said pivoted clutch member and adapted to be engaged with said bar member for operation of said spring means and said clutch member, said turnable clutch member being advanced in the same direction as said bar member is pivotally moved in response to depression of at least one of said keys and being returned in the same direction as said bar member is moved in returning to its normal position whereby said turnable member of said musical movement is actuated in a step-by-step motion so that repeated operation of said keys results in continued operation of the musical movement.

References Cited in the file of this patent

UNITED STATES PATENTS 1,667,078    Patten _____ Apr. 24, 1928